(12) United States Patent
Matysiak et al.

(10) Patent No.: US 11,734,404 B2
(45) Date of Patent: Aug. 22, 2023

(54) ROBOT GATEKEEPER FOR AUTHENTICATION PRIOR TO MEETING ATTENDANCE

(71) Applicant: KYOCERA Document Solutions Inc., Osaka (JP)

(72) Inventors: Jacek Joseph Matysiak, Concord, CA (US); Dilinur Wushour, Clayton, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 394 days.

(21) Appl. No.: 17/154,997

(22) Filed: Jan. 21, 2021

(65) Prior Publication Data

US 2022/0229889 A1  Jul. 21, 2022

(51) Int. Cl.
| | |
|---|---|
| G06F 21/32 | (2013.01) |
| G06F 21/60 | (2013.01) |
| G06K 19/07 | (2006.01) |
| G06N 20/00 | (2019.01) |
| G07C 9/00 | (2020.01) |

(Continued)

(52) U.S. Cl.
CPC .............. *G06F 21/32* (2013.01); *G06F 18/22* (2023.01); *G06F 21/602* (2013.01); *G06K 19/0723* (2013.01); *G06N 20/00* (2019.01); *G06V 30/36* (2022.01); *G07C 9/00309* (2013.01); *G06F 2221/2103* (2013.01); *G07C 2009/00388* (2013.01); *G07C 2009/00412* (2013.01)

(58) Field of Classification Search
CPC ........ G06F 21/32; G06F 21/602; G06F 18/22; G06F 2221/2103; G06V 30/36; G07C 9/00309; G07C 2009/00388; G07C 2009/00412; G06K 19/0723; G06N 20/00
See application file for complete search history.

(56) References Cited

U.S. PATENT DOCUMENTS

| | | | | |
|---|---|---|---|---|
| 5,960,085 | A  * | 9/1999 | de la Huerga | G16H 40/20 |
| | | | | 235/382 |
| 8,553,245 | B2 * | 10/2013 | Sakagami | H04N 1/00344 |
| | | | | 713/168 |

(Continued)

OTHER PUBLICATIONS

NPL Search Terms (Year: 2023).*

*Primary Examiner* — Syed A Zaidi
(74) *Attorney, Agent, or Firm* — W. Webostad

(57) ABSTRACT

Systems and methods relate generally to attendee authentication. In a method, a robot gatekeeper has a multi-function printer with program code configured for character recognition and handwriting analysis. The program code is executed by a processor coupled to the memory to initiate operations including: instructing for placement of a hand for a palm vein scanner and a badge for a badge reader; reading a badge to obtain first identification information; reading a palm to obtain first biometric data; accessing a database to obtain second identification information responsive to the first identification information; comparing the first biometric data and second biometric data obtained from the second identification information; printing an anti-tampering feature on a card; scanning a hand written sample on the card; and analyzing the hand written sample scanned with respect to at least one handwriting exemplar in or associated with the second identification information.

20 Claims, 8 Drawing Sheets

(51) Int. Cl.
    *G06V 30/32*    (2022.01)
    *G06F 18/22*    (2023.01)

(56)        References Cited

U.S. PATENT DOCUMENTS

2004/0056889 A1    3/2004  Katano
2004/0151346 A1*   8/2004  Weiss ................ G07C 9/37
                                                    382/115
2015/0221151 A1*   8/2015  Bacco ............... H04W 12/64
                                                   340/5.83
2016/0308859 A1*  10/2016  Barry ................ G07C 9/22
2017/0149517 A1*   5/2017  Xie ................ G06V 30/142
2019/0303051 A1*  10/2019  Hwang .............. G06F 3/1238
2019/0392130 A1*  12/2019  Tazuke ........... G06V 30/1456
2020/0296452 A1*   9/2020  Drolia .............. G06V 20/52

* cited by examiner

US 11,734,404 B2

ROBOT GATEKEEPER FOR AUTHENTICATION PRIOR TO MEETING ATTENDANCE

FIELD

The following description relates to security. More particularly, the following description relates to authentication prior to meeting attendance using a robot gatekeeper.

BACKGROUND

Conventionally, secure meetings have involved human screeners. However, human screeners may have security limitations.

SUMMARY

In accordance with one or more below described examples, a method relating generally to attendee authentication is disclosed. In such a method, there is a robot gatekeeper having a multi-function printer with a memory to store program code including for character recognition and handwriting analysis. The program code is executed by a processor coupled to the memory to initiate operations. The operations include: instructing, by the robot gatekeeper, for placement of a hand for a palm vein scanner and placement of a badge for a badge reader; reading a badge with the badge reader to obtain first identification information; reading a palm of the hand with the palm vein scanner to obtain first biometric data; accessing a database to obtain second identification information responsive to the first identification information; comparing the first biometric data and second biometric data obtained from the second identification information; responsive to at least a threshold confidence level between the first biometric data and the second biometric data, printing an anti-tampering feature on a card; scanning a hand written sample on the card; and analyzing the hand written sample scanned with respect to at least one handwriting exemplar in or associated with the second identification information.

In accordance with one or more below described examples, an information processing system relating generally to attendee authentication is disclosed. In such a system, a robot gatekeeper has a multi-function printer with a memory to store program code including for character recognition and handwriting analysis. A processor is coupled to the memory and configured to execute the program code to initiate operations. The operations include: instructing, by the robot gatekeeper, for placement of a hand for a palm vein scanner and placement of a badge for a badge reader; reading a badge with the badge reader to obtain first identification information; reading a palm of the hand with the palm vein scanner to obtain first biometric data; accessing a database to obtain second identification information responsive to the first identification information; comparing the first biometric data and second biometric data obtained from the second identification information; responsive to at least a threshold confidence level between the first biometric data and the second biometric data, printing an anti-tampering feature on a card; scanning a hand written sample on the card; and analyzing the hand written sample scanned with respect to at least one handwriting exemplar in or associated with the second identification information.

Other features will be recognized from consideration of the Detailed Description and Claims, which follow.

BRIEF DESCRIPTION OF THE DRAWINGS

Accompanying drawings show exemplary apparatus(es) and/or method(s). However, the accompanying drawings should not be taken to limit the scope of the claims, but are for explanation and understanding only.

FIG. 1-2 is a block diagram of a right-side view depicting the example of the robot gatekeeper of FIG. 1-1.

FIG. 2 is a block diagram depicting an example of an information processing system ("attendee authentication system") used for a meeting or another type of event for attendee authentication.

FIG. 3-1 is a flow diagram depicting an example of a secure meeting flow for admitting an attendee to a secure meeting room and processing therein.

FIG. 3-2 is a flow diagram depicting an example of an authentication flow.

DETAILED DESCRIPTION

Figure 1:
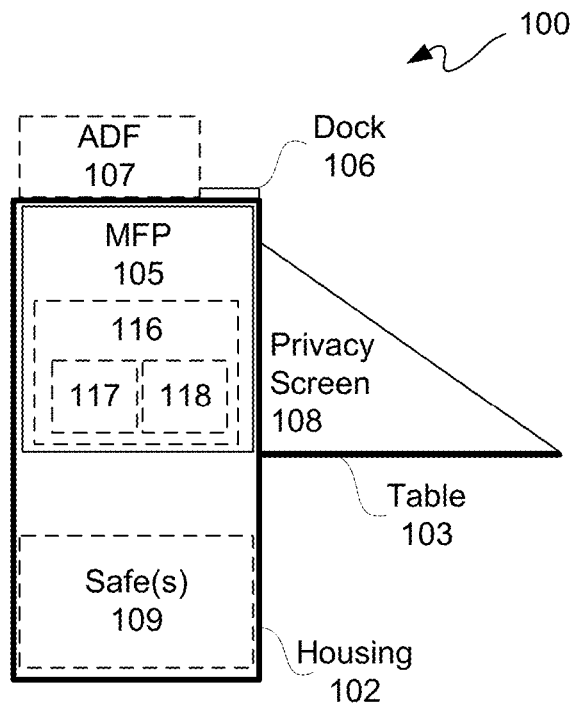
FIG. 1-1 is a block diagram of a front view depicting an example of a robot "gatekeeper" for a meeting or another type of event for attendee authentication.

In the following description, numerous specific details are set forth to provide a more thorough description of the specific examples described herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same number labels are used in different diagrams to refer to the same items; however, in alternative examples the items may be different.

Exemplary apparatus(es) and/or method(s) are described herein. It should be understood that the word "exemplary" is used herein to mean "serving as an example, instance, or illustration." Any example or feature described herein as "exemplary" is not necessarily to be construed as preferred or advantageous over other examples or features.

Before describing the examples illustratively depicted in the several figures, a general introduction is provided to further understanding.

As previously indicated, holding secure meetings can be challenging, including when parties are not all well known to each other. A robot gatekeeper system allows for authentication of each prospective attendee, including previously unknown or not well-known parties.

With the above general understanding borne in mind, various configurations for robot authentication systems, and methods therefor, are generally described below.

Reference will now be made in detail to examples which are illustrated in the accompanying drawings. In the following detailed description, numerous specific details are set forth in order to provide a thorough understanding of the following described implementation examples. It should be apparent, however, to one skilled in the art, that the implementation examples described below may be practiced without all the specific details given below. Moreover, the example implementations are not intended to be exhaustive or to limit scope of this disclosure to the precise forms disclosed, and modifications and variations are possible in light of the following teachings or may be acquired from practicing one or more of the teachings hereof. The implementation examples were chosen and described in order to best explain principles and practical applications of the teachings hereof to enable others skilled in the art to utilize one or more of such teachings in various implementation examples and with various modifications as are suited to the particular use contemplated. In other instances, well-known methods, procedures, components, circuits, and/or networks have not been described in detail so as not to unnecessarily obscure the described implementation examples.

For purposes of explanation, specific nomenclature is set forth to provide a thorough understanding of the various concepts disclosed herein. However, the terminology used herein is for the purpose of describing particular examples only and is not intended to be limiting. As used herein, the singular forms "a", "an" and "the" are intended to include the plural forms as well, unless the context clearly indicates otherwise. As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. It will also be understood that the term "and/or" as used herein refers to and encompasses any and all possible combinations of one or more of the associated listed items. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof. It will also be understood that, although the terms first, second, etc. may be used herein to describe various elements, these elements should not be limited by these terms, as these terms are only used to distinguish one element from another.

Some portions of the detailed descriptions that follow are presented in terms of algorithms and symbolic representations of operations on data bits, including within a register or a memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those involving physical manipulations of physical quantities. Usually, though not necessarily, these quantities take the form of optical, electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers or memories into other data similarly represented as physical quantities within the computer system memories or registers or other such information storage, transmission or display devices.

Concepts described herein may be embodied as apparatus, method, system, or computer program product. Accordingly, one or more of such implementation examples may take the form of an entirely hardware implementation example, an entirely software implementation example (including firmware, resident software, and micro-code, among others) or an implementation example combining software and hardware, and for clarity any and all of these implementation examples may generally be referred to herein as a "circuit," "module," "system," or other suitable terms. Furthermore, such implementation examples may be of the form of a computer program product on a computer-usable storage medium having computer-usable program code in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory ("RAM"), a read-only memory ("ROM"), an erasable programmable read-only memory ("EPROM" or Flash memory), an optical fiber, a portable compact disc read-only memory ("CD-ROM"), an optical storage device, a transmission media such as those supporting the Internet or an intranet, or a magnetic storage device. The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, radio frequency ("RF") or other means. For purposes of clarity by way of example and not limitation, the latter types of media are generally referred to as transitory signal bearing media, and the former types of media are generally referred to as non-transitory signal bearing media.

Computer program code for carrying out operations in accordance with concepts described herein may be written in an object-oriented programming language such as Java, Smalltalk, C++ or the like. However, the computer program code for carrying out such operations may be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network ("LAN") or a wide area network ("WAN"), or the connection may be made to an external computer (for example, through the Internet using an Internet Service Provider).

Systems and methods described herein may relate to an apparatus for performing the operations associated therewith. This apparatus may be specially constructed for the purposes identified, or it may include a general-purpose computer selectively activated or reconfigured by a computer program stored in the computer.

Notwithstanding, the algorithms and displays presented herein are not inherently related to any particular computer or other apparatus. Various general-purpose systems may be used with programs in accordance with the teachings herein, or it may prove convenient to construct a more specialized apparatus to perform the operations. In addition, even if the following description is with reference to a programming language, it should be appreciated that any of a variety of programming languages may be used to implement the teachings as described herein.

One or more examples are described below with reference to flowchart illustrations and/or block diagrams of methods, apparatus (including systems) and computer program products. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the Figures illustrate the architecture, functionality, and operation of possible implementations of apparatuses (including systems), methods and computer program products according to various implementation examples. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

It should be understood that although the flow charts provided herein show a specific order of operations, it is understood that the order of these operations may differ from what is depicted. Also, two or more operations may be performed concurrently or with partial concurrence. Such variation will depend on the software and hardware systems chosen and on designer choice. It is understood that all such variations are within the scope of the disclosure. Likewise, software and web implementations may be accomplished with standard programming techniques with rule-based logic and other logic to accomplish the various database searching operations, correlation operations, comparison operations and decision operations. It should also be understood that the word "component" as used herein is intended to encompass implementations using one or more lines of software code, and/or hardware implementations, and/or equipment for receiving manual inputs.

Figures 1, 2:
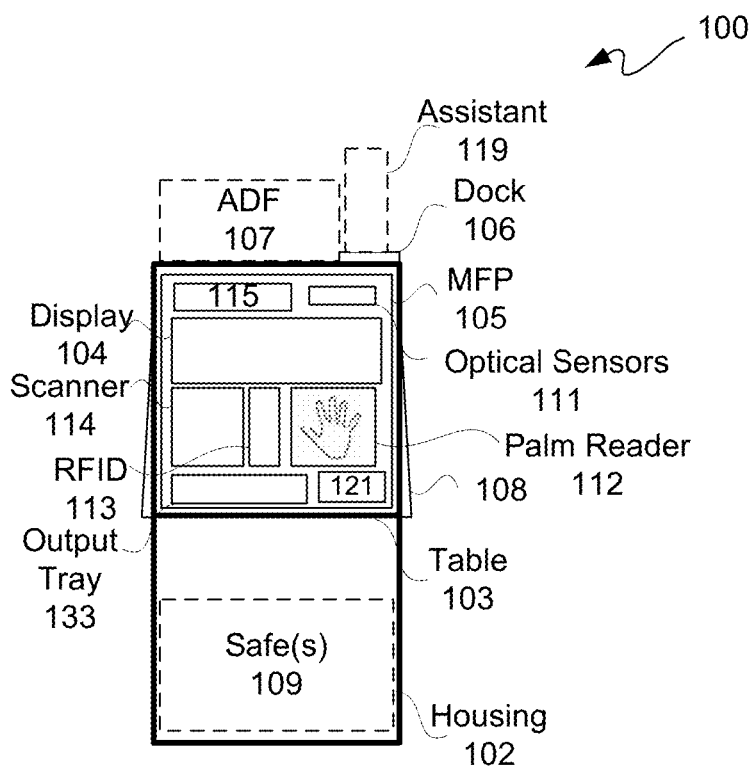
Figure 2:
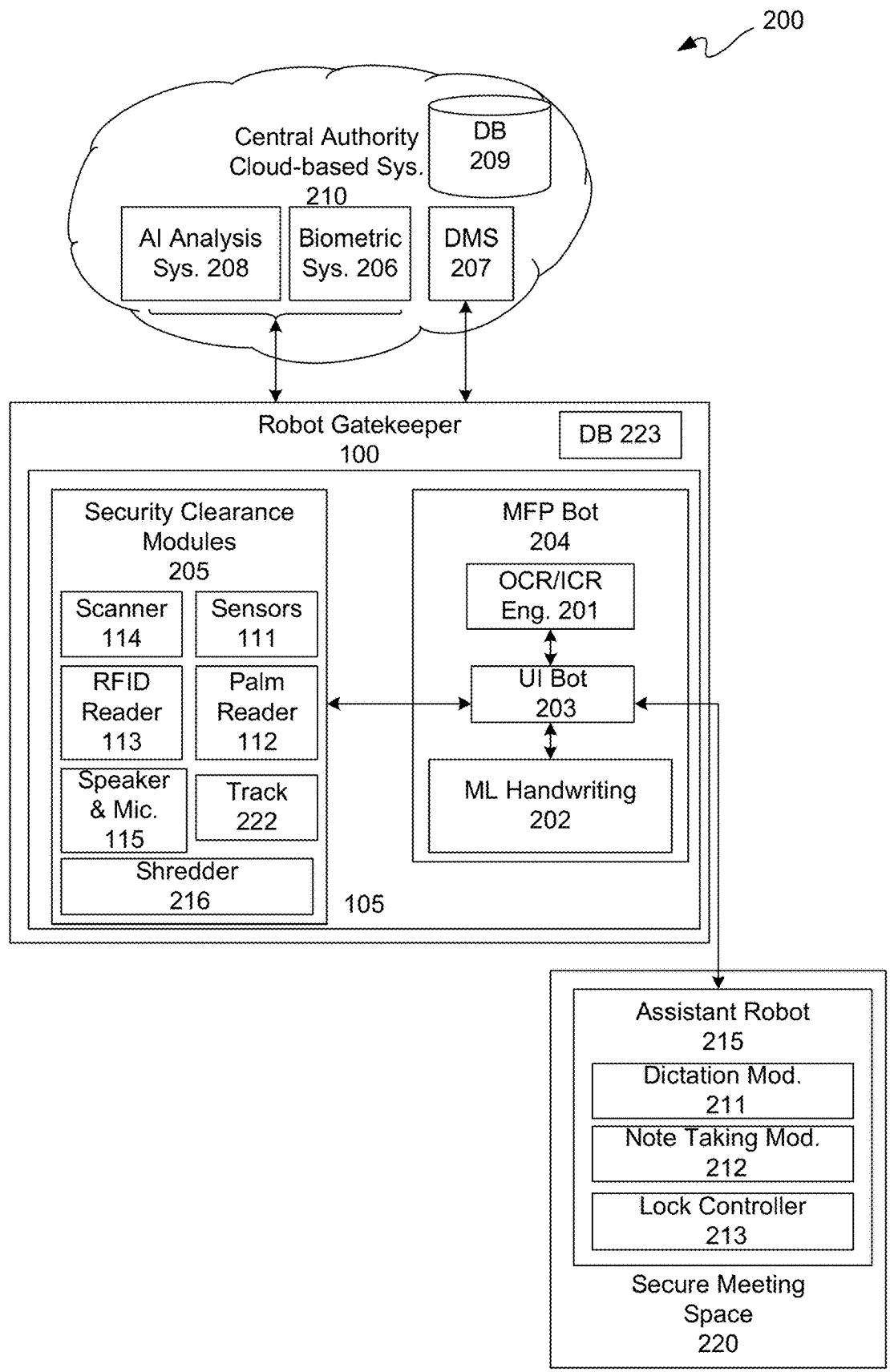

FIG. 1-1 is a block diagram of a front view depicting an example of a robot "gatekeeper" 100 for a meeting or another type of event for attendee authentication. FIG. 1-2 is a block diagram of a right-side view depicting the example of robot gatekeeper 100 of FIG. 1-1. Robot gatekeeper 100 is further described with simultaneous reference to FIGS. 1-1 and 1-2.

In this example, a robot gatekeeper 100 includes a multifunction printer ("MFP") 105 with computational processing system 116, including a memory configured to store program code coupled to a processor. Such program code may include a known character recognition and handwriting analysis engine 117 in communication with a processor of MFP 105. Optionally, a voice recognition and speech engine 118 may be included for verbal communication with MFP 105.

Along those lines, a processor of MFP 105 may be coupled to memory thereof where such processor is configured to execute program code, in addition to such known character recognition and handwriting analysis engine 117 to initiate operations described below in additional detail.

Robot gatekeeper 100 in this example may include an optional automatic document feeder ("ADF") 107, a privacy screen 108, a cantilevered table 103, and a housing 102. In this example, housing 102 may include one or more optional safes; however, in another example one or more optional safes may be separate from robot gatekeeper 100. Robot gatekeeper 100 may further optionally include a card input slot 121.

Robot gatekeeper 100 may include a dock 106 such as for a digital assistant 119. Known examples of digital assistants 119 generally are referred to by their trademarked names, such as for example Cortana, Google Assistant, Alexa, Siri, and Bixby, among others.

In this example of robot gatekeeper 100, MFP 105 includes a display 104, optical sensors 111, a radio frequency identification ("RFID") or card chip reader 113, a speaker and microphone 115, an MFP scanner 114, a palm reader scanner ("palm reader") 112, and an output tray 133. Robot gatekeeper 100 may be located for example in a foyer, anteroom, entry way, or other chamber or chamber-like room leading to a secure meeting room. For purposes of clarity by way of example and not limitation, a foyer is assumed to be a location of a robot gatekeeper 100. Furthermore, for purposes of clarity by way of example, an RFID reader 113 is assumed; however, another type of badge or card reader may be used in another example.

Secure meetings may be held in a secure room. A secure room may be shielded depending upon level of security from electromagnetic, sound, vibration, visual, or other sensory intrusion and/or leakage. A robot gatekeeper 100 may be located outside a secure room in a foyer in order to perform authentication of prospective meeting attendees. Along those lines, optionally a safe may be used to temporarily store an attendee's belongings prior to permitted entry into a secure meeting room, such as for safekeeping of any and all electronic devices of each authorized attendee.

FIG. 2 is a block diagram depicting an example of an information processing system ("attendee authentication system") 200 used for a meeting or another type of event for attendee authentication. Attendee authentication system 200 is further described with simultaneous reference to FIGS. 1-1 through 2.

Attendee authentication system 200 may include a robot gatekeeper 100 positioned in a foyer to a secure meeting space ("secure meeting room") 220. Secure meeting room 220 may include conventional conference room electronics for such secure meeting rooms, which may depend upon level of security. Additionally, an assistant robot 215 may be located in secure meeting room 220.

Assistant robot 215 may be configured with a dictation module 211, a note taking module 212, an electronic lock 213, a digitizer 214, and a shredder 216. Dictation module 211 and note taking module 212 may be for converting speech to text. However, note taking module 212 may include both an audio input and a video input, whereas dictation module 211 may be include just an audio input.

Assistant robot 215 may include an electronic lock controller 213 for locking and unlocking an electronic lock to control access to and from secure meeting room 220. A digitizer scanner 214, which may include an ADF, may be used to digitize attendee notes taken on paper during a meeting. Sheets of paper fed into assistant robot 215 for digitizing are not returned to an attendee, but rather are shredded by shredder 216 of assistant robot 215.

Assistant robot 215 may be in communication with a user interface ("UI") bot 203 of an MFP bot 204 of an MFP 105 of robot gatekeeper 100. An MFP bot 204 may further include an optical character recognition ("OCR") and/or intelligent character recognition ("ICR") engine 201 in communication with UI bot 203. MFP bot 204 may further include a machine learning handwriting analysis ("ML") engine 202 in communication with UI bot 203. Known OCR and/or ICR components may be used to provide OCR/ICR engine 201. Furthermore, known machine learning and handwriting analysis may be used to provide ML engine 202.

UI bot 203 may be in communication with one or more of security clearance components 205. Security clearance components 205 in this example include MFP scanner 114, optical sensors 111, RFID reader 113, and palm reader 112. A speaker and microphone 115 may be used for verbal communication with robot gatekeeper 100.

Robot gatekeeper 100 may be in communication with a central authority cloud-based system ("central authority") 210. Even though in this example, a cloud-based central authority 210 is used, in another example an intranet or other type of network topology may be used for central authority 210.

Central authority 210 may include a biometric system 206 and an artificial intelligence ("AI") analysis system 208. AI analysis system 208 may be programmed for handwriting analysis. Biometric system 206 may be programmed for palm print analysis and optionally retinal analysis. Systems 206 and 208 may be in communication with robot gatekeeper 100 for more extensive authentication measures.

Central authority 210 may further include one or more databases ("DB") 209 under control of a document management system ("DMS") 207 or the like. DMS 207 may be in communication with robot gatekeeper 100 and DB 209 for managed control to obtain data from and store data in DB 209. For example, dictation notes by dictation module 211 and/or digitized notes by digitizer scanner 214 may be entered into DMS 207 for storing in DB 209.

For authentication, a "marked" paper is used for having a person write something for handwriting and make sure they are writing it themselves for providing an answer to challenge response. This may be used to avoid having store facial and/or voice information of operatives, in order to keep such information more secure by not having it accessible at this location. For example, facial and/or voice recognition information falling into the hands of an adversary could be used for remote identification, such as by video and/or audio surveillance. Having a person provide one or more writing samples to one or more challenges along with vein scanning may be used to avoid accessing stored facial and/or voice personal identifying information at this location.

Figures 1, 3:
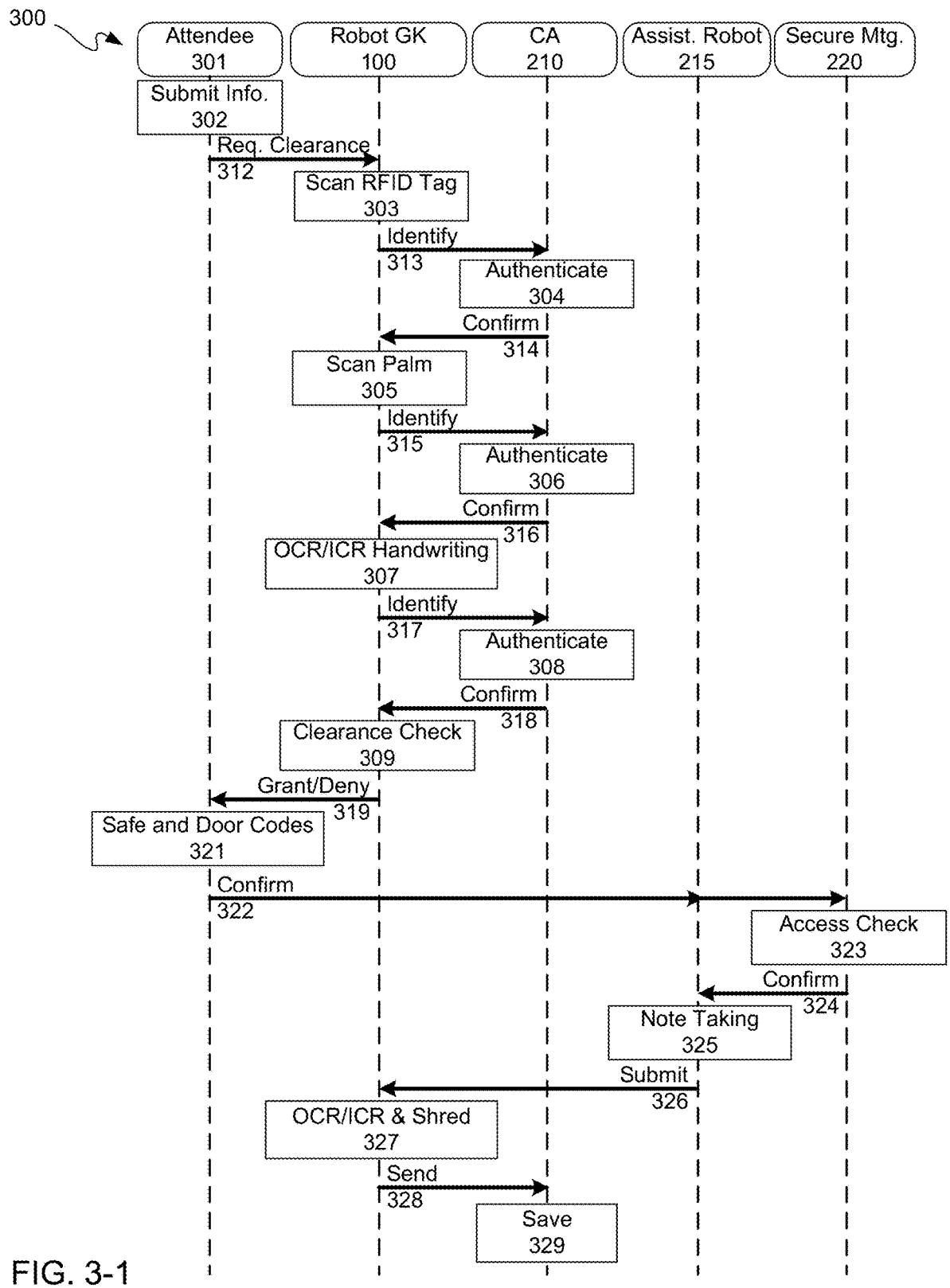
Figures 2, 3:
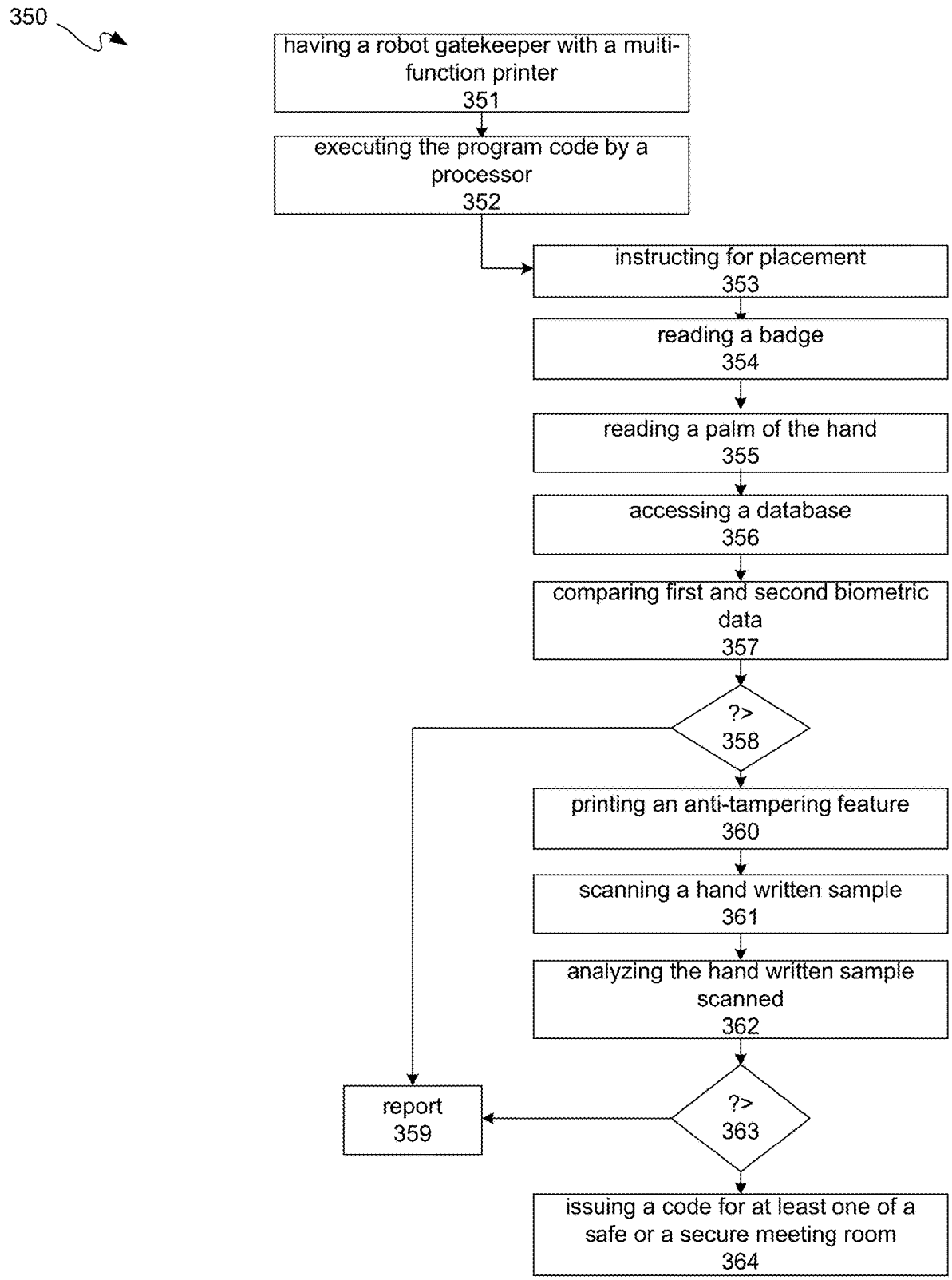

FIG. 3-1 is a flow diagram depicting an example of a secure meeting flow 300 for admitting an attendee to a secure meeting room and processing therein. FIG. 3-2 is a flow diagram depicting an example of an authentication flow 350. Secure meeting flow 300 and authentication flow 350 are further described with simultaneous reference to FIGS. 1-1 through 3-2.

In an example, for authentication of a prospective meeting attendee, attendee authentication system 200, and particularly robot gatekeeper 100 thereof, may use a combination of challenge response questions, handwriting analysis, and palm vein identification. Optical body/skeletal tracking may be used too, as described below in additional detail. Any of a variety of combinations of operations may be used, and these combinations may change from time to time to enhance security. Accordingly, example flows are described; however, these flows may use other security features in other examples.

At operation 302, a prospective attendee 301 may submit personal and other identification information to a robot gatekeeper 100 as part of a clearance request 312. This input may include scanning a driver's license, a passport, and/or other personal identification information. Thus, at operation 351 a robot gatekeeper 100 with an MFP 105 may be present in a foyer to a secure meeting room 220. Responsive to a clearance request, at operation 352 program code may be executed by a programmed processor or processor system of a robot gatekeeper 100, or more particularly of an MFP 105 thereof.

Secure meeting flow 300 is described hereinafter. Following description of secure meeting flow 300, authentication flow 350, which may be performed locally without a central authority 210, or as part of secure meeting flow with a central authority 210, is described after the following description of secure meeting flow 300.

At operation 303, an RFID tag may be scanned into a robot gatekeeper 100, and a request 313 to verify such tag may be provided to a central authority 210. At operation 304, a central authority 210 may authenticate, or not, such tag. For purposes of clarity and not limitation, it is assumed that a tag is authenticated.

At operation 305 in response to confirmation 314 of authentication from central authority 210 to robot gatekeeper 100, a palm may be scanned in at operation 305 using a palm reader 112 to provide a request 315 to verify veins of such palm may authenticate, or not, such palm. For purposes of clarity and not limitation, it is assumed that a palm is authenticated remotely, such as by a central authority 210; however, in another example a palm may be authenticated locally by a robot gatekeeper 100.

At operation 306, a central authority 210 may authenticate a palm. In response to authentication, a confirmation 316 may be sent from central authority 210 to robot gatekeeper 100. In response to such confirmation, at operation 307 a recognition operation, such as an OCR and/or ICR operation, may be performed on a handwriting sample scanned in at such operation.

A request 317 for authentication of such handwriting example may be sent from robot gatekeeper 100 to central authority 210 for authentication, or not, such handwritten exemplar. For purposes of clarity and not limitation, it is assumed that a handwritten exemplar is authenticated.

At operation 308, a central authority 210 may authenticate a handwriting exemplar, and provide a confirmation 318 of such authentication to robot gatekeeper. Other security operations with examples, requests, authentications, and corresponding confirmations may be performed in other examples.

After confirmation of authentication of each security check, a security clearance complete verification operation 309 may be performed. Responsive to completion and confirmation of each authentication, access to a secure meeting room 220 may be granted at operation 319. If any authentication fails to be confirmed, a prospective attendee may be denied access at operation 319 to a secure meeting room 220.

Responsive to passing all authentications, a code for at least one of a safe or a secure meeting room, or separate codes for each, may be issued at operation 321 for such access to a secure meeting room 220. For security reasons, a code may be sent to an assistant robot 215 or an electronic lock to such secure meeting room, or both. Such a code may be a random code assigned for entry into a secure meeting room 220. Such a random code may be sent with confirmation 322, and so a prospective attendee may input such an assigned random code into an electronic lock for entry at access check operation 323. As an assistant robot 215 may too have such an assigned code for an access check operation 323, an assistant robot 215 may be used to control an electronic locking mechanism to secure meeting room 220.

After a correct access code is entered at operation 323, a confirmation 324 may be sent to assistant robot 215. In response, assistant robot 215 may begin taking meeting notes at note taking operation 325 with note taking module 212. Furthermore, a dictation module 211 may be invoked, such as for a meeting summary or other post-meeting activity.

Furthermore, for notes taken by one or more meeting attendees, such notes may be submitted at operation 326 to assistant robot 215. Assistant robot 215 may scan in such notes using one or more of OCR or ICR with digitizer scanner 214 at operation 327. Paper notes submitted may then be shredded by shredder 216 at operation 327. Digitized notes may be sent at operation 329 to central authority 210 for saving at operation 329, such as for subsequent access via DMS 207.

With renewed reference to authentication flow 350, at operation 353, a robot gatekeeper 100 may instruct for placement of a hand for a palm vein scanner, such as a palm reader 112, and instruct for placement of a badge for a badge reader, such as RFID reader 113.

At operation 354, a badge may be read with a badge reader, such as RFID reader 113 to obtain source identification information. At operation 355, a palm of a hand may be read with palm vein scanner, such as palm reader 112, to obtain source biometric data.

Robot gatekeeper 100 may be configured for body and/or skeletal tracking, such tracking module 222 in communication with optical sensors 111. Such tracking may be used to ensure a person's hand does not move outside a bounded region. Such tracking may be used to ensure a false or extra hand is not supplied. Such tracking may be used for handwriting evaluation too to ensure a handwriting sample in response to a challenge question is an original from a prospective attendee, and not a pre-written substitute.

At operation 356, a database, such as DB 209 or a local database 223, may be accessed to obtain stored identification information responsive to such source identification information. At operation 357, such source biometric data may be compared with stored biometric data obtained from such stored identification information. Furthermore, at operation 357 other source identification information may be compared with corresponding stored identification information, such as information conventionally appearing on a driver's license, identification card, and/or a passport for example.

At operation 358, it may be determined within a greater than 90 percent confidence level that stored and source biometric data agree. Furthermore, at operation 358 it may optionally be determined that all identification information as between badge read source identification information, apart from source biometric data, exactly match corresponding stored identification information. Responsive to at least a threshold confidence level between source biometric data and stored biometric data, and optionally an exact match for source and stored identification information, a card may be printed and dispensed, such as via output tray 133, with an anti-tampering feature and a question for a challenge response on such a card.

Robot gatekeeper 100 may pose a challenge response by printing a card with a question for a prospective attendee to answer by writing on such card. Such card may have anti-tampering features such as a sequence or random number. After writing a challenge response on such a card, such a hand written sample on such a card may be scanned in, such as by scanner 114, or fed into a destination slot, such as card input slot 121, of robot gatekeeper 100 at operation 361. Robot gatekeeper 100 may OCR and/or ICRs such card using OCR/ICR engine 201, and then compare an answer on such a card to an answer stored in database 223 or DB 209 in association with obtained stored identification information. Furthermore, robot gatekeeper 100 may be programmed to encrypt or other form of indirect, obfuscated representation of such handwriting exemplar in combination with some or all of such stored identification information. A challenge question may be tied to a challenge response stored in a secure format with stored identification information. If only local to robot gatekeeper 100, such a secure format may include a hash of associated with a portion of such stored identification information.

In another example, a prospective attendee may be issued a card printed with a randomly chosen phrase or sentence. A handwritten response may be made on such card by a prospective attendee to such phrase or sentence, and such a prospective attendee may feed such card into card input slot 121.

After robot gatekeeper 100 scans such a card, at operation 362 such a hand written sample scanned may be analyzed, such as for example compared with respect to at least one handwriting exemplar in or associated with retrieved stored identification information. Robot gatekeeper 100 conducts handwriting analysis with ML engine 202 in unsupervised machine learning. In another example, a scanned card may be digitally sent for a person to determine manually by comparing it against sample in DB 209. In this other example, both ML engine 202 and sending a digital version to central authority 210 may be used for supervised machine learning.

If at operation 358 it is determined there is not a match between stored and badge identification information or failure to achieve of a sufficient confidence level for biometric data said to be a match, then at operation 359 such a prospective attendee may be reported to an administrative authority. Similarly, at operation 363, it may be determined whether a handwriting sample has achieved a sufficient confidence level so as to be said to match and whether a response to a challenge phrase or sentence is correct, namely an exact match. If at operation 363 it is determined there is not a match between a response to a challenge phrase or sentence and a stored version, or failure to achieve of a sufficient confidence level between a stored handwriting exemplary and one sourced from a prospective attendee, then at operation 359 such a prospective attendee may be reported to an administrative authority.

Robot gatekeeper 100 may collect handwriting samples to conduct "handwriting analysis" when deciding whether a party should be permitted entry to a secure meeting space. Robot gatekeeper 100 may conducts OCR/ICR locally. Along those lines, MFP 105 can use a combination of handwritten samples and corresponding original requested phrase/text to improve its OCR/ICR models via locally run machine learning. Such samples and original text combinations can be sent to DB 209 for further processing by central authority 210. Central authority 210 may have additional written samples and original text combinations from a variety of MFPs 105, which may result in machine learning constructing/improving models better.

Along those lines, optionally after and/or during a meeting, assistant robot 215 gatekeeper may process an attendee's handwritten notes, scanning them, digitizing them, such as via OCR/ICR, and storing a digitized version in database 223 and/or DB 209. MFP 105 can use such handwritten notes to improve its machine learning OCR/ICR models. Due to a potentially sensitive nature of such notes, such notes in some instances may not be sent to a central authority 210 in whole or in part. MFP 105 may be configured to find whitelisted dictionary words, namely to avoid sensitive materials, that it recognizes via existing OCR/ICR, as well as words that meet a confidence level threshold. For example, detecting a word or phrase with a low confidence may mean an unusual term or phrase is used, namely possibly a confidential word. These words may be sent to a central database along with a corresponding text image for further processing to improve an OCR/ICR model via machine learning.

Handwriting samples from potential attendees can be used for prediction of age, gender, and/or nationality. Handwriting samples obtained by a robot gatekeeper 100 can be used to improve or create models for prediction of age, gender, and/or nationality. These models can be used in other security-style applications, such as for example vetting people filling out government/company application forms, potentially detecting mismatches in declared age, gender, and/or nationality.

Responsive to a challenge response being correct and achieving a sufficient confidence level between a stored handwriting example and one just sourced from a prospective attendee matching, at operation 364 a code for at least one of a safe or a secure meeting room may be issued. A same code may be issued for both a safe and a secure meeting room, or different codes may be issued for a safe and a secure meeting room. An authenticated person who has been granted access to a secure meeting may place their belongings in a safe, such as in a foyer, or place such belongings in a safe-like compartment of robot gatekeeper 100.

Once a secure meeting is underway, there may be additional persons wishing to join the meeting. A robot gatekeeper can authenticate each new person, and existing attendees can communicate with robot gatekeeper 100 via assistant robot 215 to indicate if, and when, a new participant should be allowed to enter.

Assistant robot 215 can be thought of a "Echo" like device or similar device that supports dictation note taking. Meeting attendees can press start/end dictation buttons, or ask assistant robot 215 to start/end dictation. Assistant robot 215 can chime in when an authenticated meeting goer is waiting in a foyer to join. Assistant robot 215 may include a lock controller 213 to lock/unlock a secure meeting room 220 for admittance of new attendees.

Optionally, during a secure meeting, persons can take hand written notes on paper and later provide these notes to robot gatekeeper 100 for digitization using a platen and/or ADF such as of or associated with scanner 114 and later physical destruction. In this example, robot gatekeeper 100 includes a shredder 216; however, an internal furnace or partial chemical means may be used in other examples. In another example, by providing identification and palm vein scan serving as identification per user on leaving a meeting, such user may have notes scanned. After scanning such notes via an ADF or platen, a user may keep such notes or deposit them in a shredder 216.

Notes and/or dictation that are digitized may be provided to a DMS 207 for storing. Permissions for those attending users may be set for access to such notes. If meeting attendees arrive late, leave early, or otherwise only attend a portion of a meeting, their dictation and notes may be identified for only a portion of attendance.

Because one or more of the examples described herein may be implemented in using an information processing system, a detailed description of examples of each of a network (such as for a Cloud-based SaaS implementation), a computing system, a mobile device, and an MFP is provided. However, it should be understood that other configurations of one or more of these examples may benefit from the technology described herein.

Figure 4:
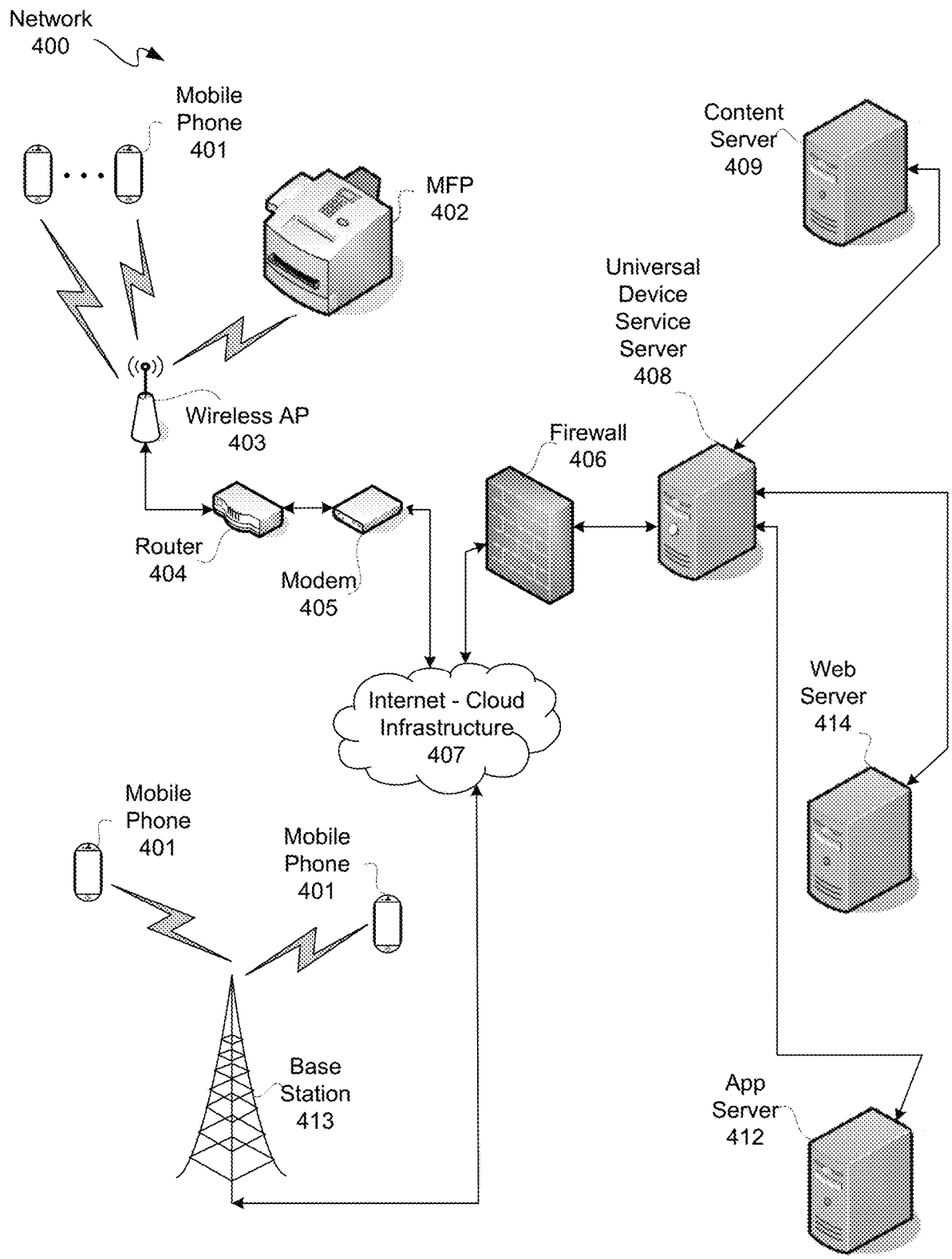
FIG. 4 is a pictorial diagram depicting an example of a network.

FIG. 4 is a pictorial diagram depicting an example of a network 400, which may be used to provide a SaaS platform for hosting a service or micro service for use by a user device, as described herein. Along those lines, network 400 may include one or more mobile phones, pads/tablets, notebooks, and/or other web-usable devices 401 in wired and/or wireless communication with a wired and/or wireless access point ("AP") 403 connected to or of a wireless router.

Furthermore, one or more of such web-usable wireless devices 401 may be in wireless communication with a base station 413. Additionally, a desktop computer and/or a printing device, such as for example a multi-function printer ("MFP") 402, each of which may be web-usable devices, may be in wireless and/or wired communication to and from router 404.

Wireless AP 403 may be connected for communication with a router 404, which in turn may be connected to a modem 405. Modem 405 and base station 413 may be in communication with an Internet-Cloud infrastructure 407, which may include public and/or private networks.

A firewall 406 may be in communication with such an Internet-Cloud infrastructure 407. Firewall 406 may be in communication with a universal device service server 408. Universal device service server 408 may be in communication with a content server 409, a web server 414, and/or an app server 412. App server 412, as well as a network 400, may be used for downloading an app or one or more components thereof for accessing and using a service or a micro service as described herein.

Figure 5:
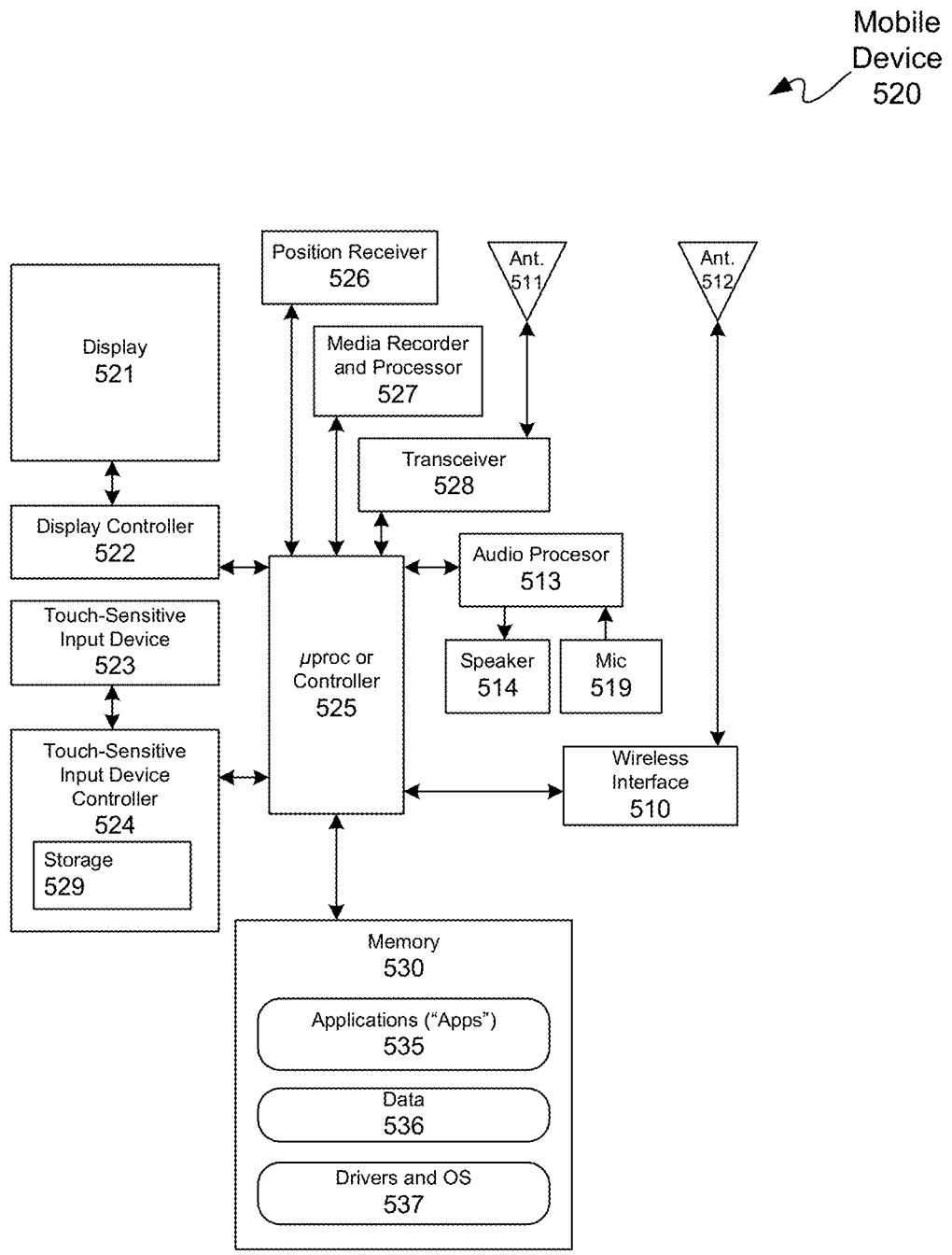
FIG. 5 is block diagram depicting an example of a portable communication device.

FIG. 5 is block diagram depicting an example of a portable communication device ("mobile device") 520. Mobile device 520 may be an example of a mobile device, as previously described.

Mobile device 520 may include a wireless interface 510, an antenna 511, an antenna 512, an audio processor 513, a speaker 514, and a microphone ("mic") 519, a display 521, a display controller 522, a touch-sensitive input device 523, a touch-sensitive input device controller 524, a microprocessor or microcontroller 525, a position receiver 526, a media recorder and processor 527, a cell transceiver 528, and a memory or memories ("memory") 530.

Microprocessor or microcontroller 525 may be programmed to control overall operation of mobile device 520. Microprocessor or microcontroller 525 may include a commercially available or custom microprocessor or microcontroller.

Memory 530 may be interconnected for communication with microprocessor or microcontroller 525 for storing programs and data used by mobile device 520. Memory 530 generally represents an overall hierarchy of memory devices containing software and data used to implement functions of mobile device 520. Data and programs or apps as described hereinabove may be stored in memory 530.

Memory 530 may include, for example, RAM or other volatile solid-state memory, flash or other non-volatile solid-state memory, a magnetic storage medium such as a hard disk drive, a removable storage media, or other suitable storage means. In addition to handling voice communications, mobile device 520 may be configured to transmit, receive and process data, such as Web data communicated to and from a Web server, text messages (also known as short message service or SMS), electronic mail messages, multimedia messages (also known as MMS), image files, video files, audio files, ring tones, streaming audio, streaming video, data feeds (e.g., podcasts), and so forth.

In this example, memory 530 stores drivers, such as I/O device drivers, and operating system programs ("OS") 537. Memory 530 stores application programs ("apps") 535 and data 536. Data may include application program data.

I/O device drivers may include software routines accessed through microprocessor or microcontroller 525 or by an OS stored in memory 530. Apps, to communicate with devices such as the touch-sensitive input device 523 and keys and other user interface objects adaptively displayed on a display 521, may use one or more of such drivers.

Mobile device 520, such as a mobile or cell phone, includes a display 521. Display 521 may be operatively coupled to and controlled by a display controller 522, which may be a suitable microcontroller or microprocessor programmed with a driver for operating display 521.

Touch-sensitive input device 523 may be operatively coupled to and controlled by a touch-sensitive input device controller 524, which may be a suitable microcontroller or microprocessor. Along those lines, touching activity input via touch-sensitive input device 523 may be communicated to touch-sensitive input device controller 524. Touch-sensitive input device controller 524 may optionally include local storage 529.

Touch-sensitive input device controller 524 may be programmed with a driver or application program interface ("API") for apps 535. An app may be associated with a service, as previously described herein, for use of a SaaS. One or more aspects of above-described apps may operate in a foreground or background mode.

Microprocessor or microcontroller 525 may be programmed to interface directly touch-sensitive input device 523 or through touch-sensitive input device controller 524. Microprocessor or microcontroller 525 may be programmed or otherwise configured to interface with one or more other interface device(s) of mobile device 520. Microprocessor or microcontroller 525 may be interconnected for interfacing with a transmitter/receiver ("transceiver") 528, audio processing circuitry, such as an audio processor 513, and a position receiver 526, such as a global positioning system ("GPS") receiver. An antenna 511 may be coupled to transceiver 528 for bi-directional communication, such as cellular and/or satellite communication.

Mobile device 520 may include a media recorder and processor 527, such as a still camera, a video camera, an audio recorder, or the like, to capture digital pictures, audio and/or video. Microprocessor or microcontroller 525 may be interconnected for interfacing with media recorder and processor 527. Image, audio and/or video files corresponding to the pictures, songs and/or video may be stored in memory 530 as data 536.

Mobile device 520 may include an audio processor 513 for processing audio signals, such as for example audio information transmitted by and received from transceiver 528. Microprocessor or microcontroller 525 may be interconnected for interfacing with audio processor 513. Coupled to audio processor 513 may be one or more speakers 514 and one or more microphones 519, for projecting and receiving sound, including without limitation recording sound, via mobile device 520. Audio data may be passed to audio processor 513 for playback. Audio data may include, for example, audio data from an audio file stored in memory 530 as data 536 and retrieved by microprocessor or microcontroller 525. Audio processor 513 may include buffers, decoders, amplifiers and the like.

Mobile device 520 may include one or more local wireless interfaces 510, such as a WIFI interface, an infrared transceiver, and/or an RF adapter. Wireless interface 510 may provide a Bluetooth adapter, a WLAN adapter, an Ultra-Wideband ("UWB") adapter, and/or the like. Wireless interface 510 may be interconnected to an antenna 512 for communication. As is known, a wireless interface 510 may be used with an accessory, such as for example a hands-free adapter and/or a headset. For example, audible output sound corresponding to audio data may be transferred from mobile device 520 to an adapter, another mobile radio terminal, a computer, or another electronic device. In another example, wireless interface 510 may be for communication within a cellular network or another Wireless Wide-Area Network (WWAN).

Figure 6:
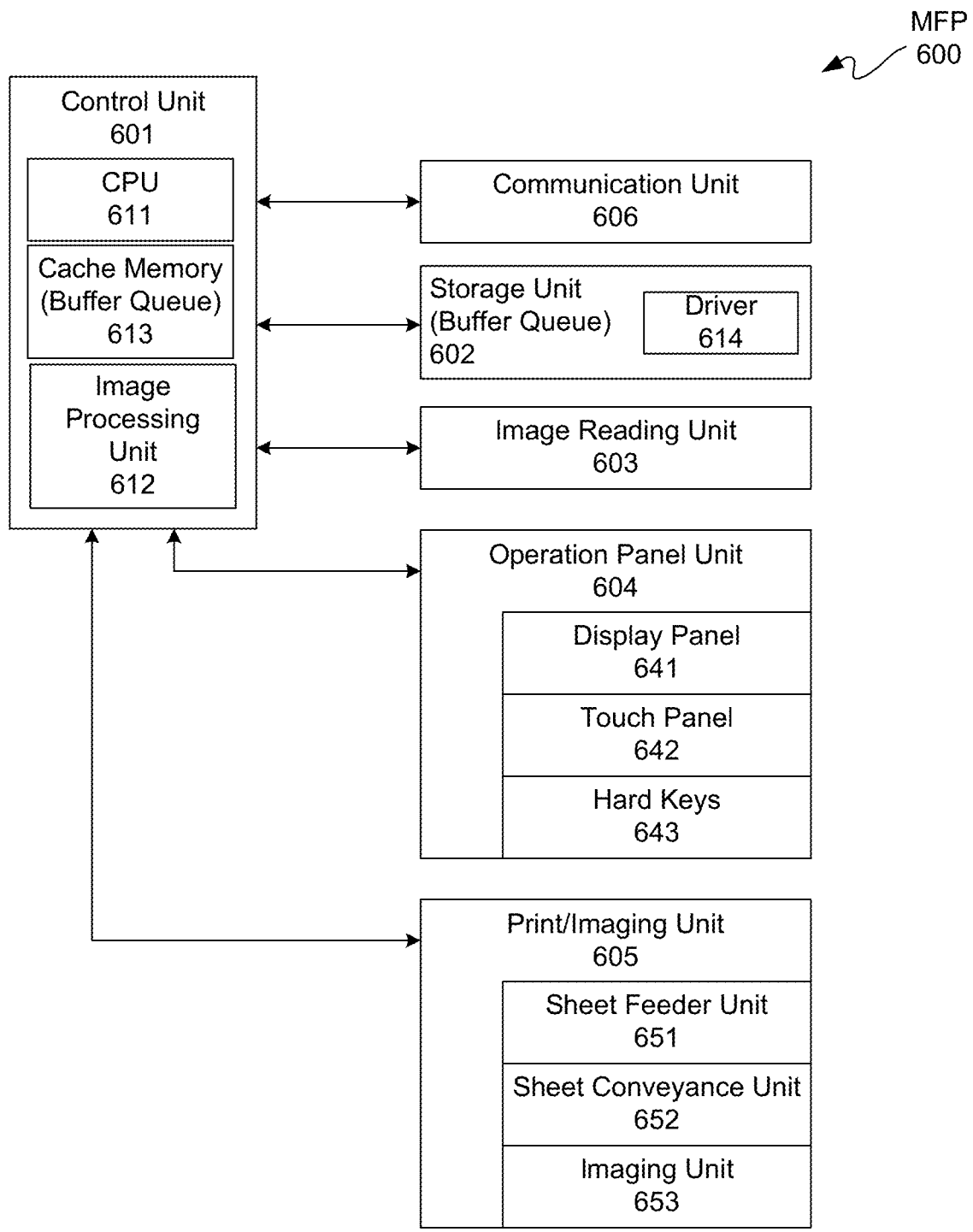
FIG. 6 is a block diagram depicting an example of a multi-function printer ("MFP").

FIG. 6 is a block diagram depicting an example of a multi-function printer (MFP) 600. MFP 600 is provided for purposes of clarity by way of non-limiting example. MFP 600 is an example of an information processing system.

MFP 600 includes a control unit 601, a storage unit 602, an image reading unit 603, an operation panel unit 604, a print/imaging unit 605, and a communication unit 606. Communication unit 606 may be coupled to a network for communication with other peripherals, mobile devices, computers, servers, and/or other electronic devices.

Control unit 601 may include a CPU 611, an image processing unit 612, and cache memory 613. Control unit 601 may be included with or separate from other components of MFP 600. Storage unit 602 may include ROM, RAM, and large capacity storage memory, such as for example an HDD or an SSD. Storage unit 602 may store various types of data and control programs, including without limitation a printer driver 614. A buffer queue, such as buffer queue may be located in cache memory 613 or storage unit 602.

Operation panel unit 604 may include a display panel 641, a touch panel 642, and hard keys 643. Print/imaging unit 605 may include a sheet feeder unit 651, a sheet conveyance unit 652, and an imaging unit 653.

Generally, for example, for an MFP a copy image processing unit, a scanner image processing unit, and a printer image processing unit may all be coupled to respective direct memory access controllers for communication with a memory controller for communication with a memory. Many known details regarding MFP 600 are not described for purposes of clarity and not limitation.

Figure 7:
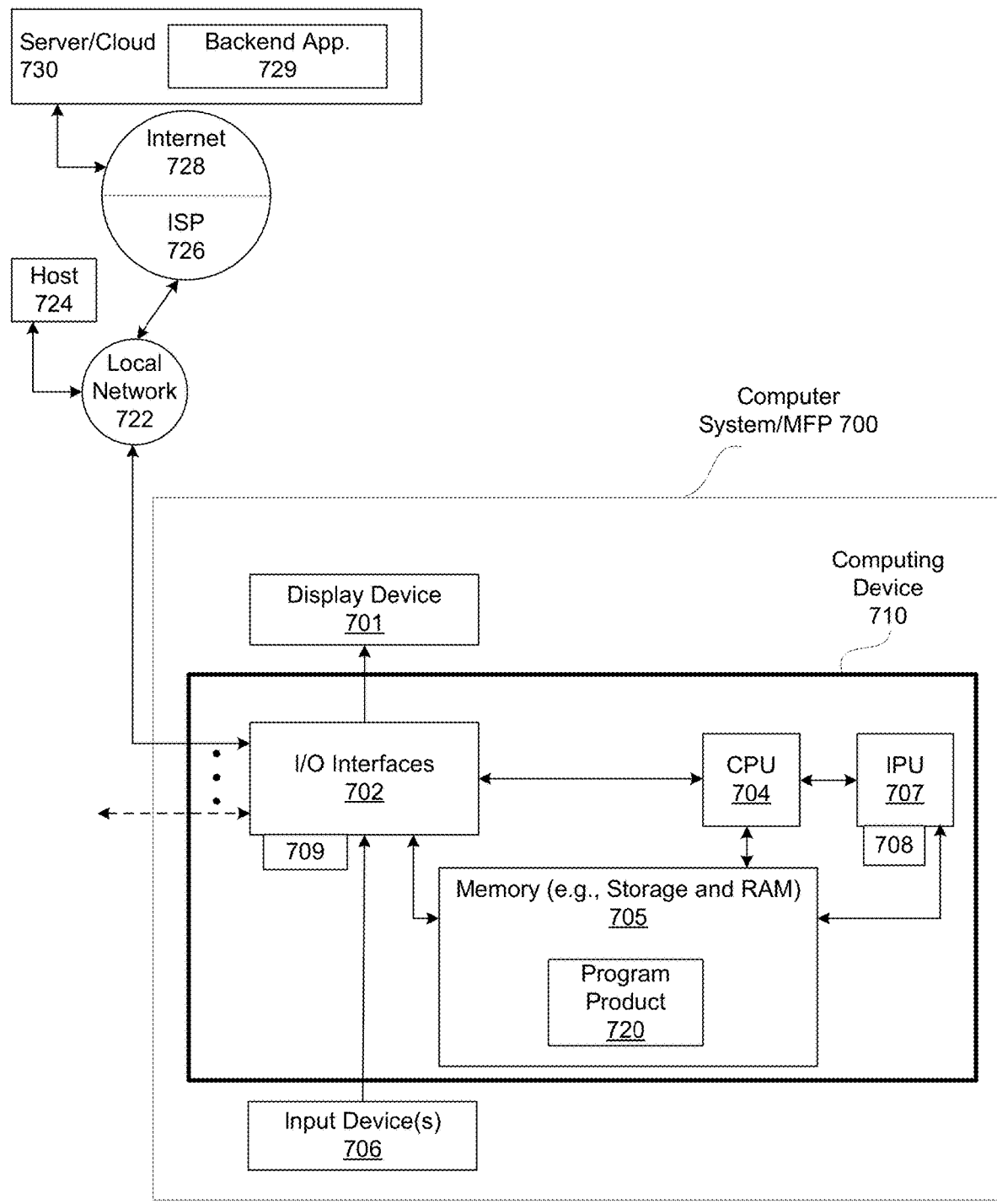
FIG. 7 is a block diagram depicting an example of a computer system.

FIG. 7 is a block diagram depicting an example of a computer system 700 upon which one or more aspects described herein may be implemented. Computer system 700 may include a programmed computing device 710 coupled to one or more display devices 701, such as Cathode Ray Tube ("CRT") displays, plasma displays, Liquid Crystal Displays ("LCDs"), Light Emitting Diode ("LED") displays, light emitting polymer displays ("LPDs") projectors and to one or more input devices 706, such as a keyboard and a cursor pointing device. Other known configurations of a computer system may be used. Computer system 700 by itself or networked with one or more other computer systems 700 may provide an information handling/processing system.

Programmed computing device 710 may be programmed with a suitable operating system, which may include Mac OS, Java Virtual Machine, Real-Time OS Linux, Solaris, iOS, Darwin, Android Linux-based OS, Linux, OS-X, UNIX, or a Windows operating system, among other platforms, including without limitation an embedded operating system, such as VxWorks. Programmed computing device 710 includes a central processing unit ("CPU") 704, one or more memories and/or storage devices ("memory") 705, and one or more input/output ("I/O") interfaces ("I/O interface") 702. Programmed computing device 710 may optionally include an image processing unit ("IPU") 707 coupled to CPU 704 and one or more peripheral cards 709 coupled to I/O interface 702. Along those lines, programmed computing device 710 may include graphics memory 708 coupled to optional IPU 707.

CPU 704 may be a type of microprocessor known in the art, such as available from IBM, Intel, ARM, and Advanced Micro Devices for example. CPU 704 may include one or more processing cores. Support circuits (not shown) may include busses, cache, power supplies, clock circuits, data registers, and the like.

Memory 705 may be directly coupled to CPU 704 or coupled through I/O interface 702. At least a portion of an operating system may be disposed in memory 705. Memory 705 may include one or more of the following: flash memory, random access memory, read only memory, magneto-resistive read/write memory, optical read/write memory, cache memory, magnetic read/write memory, and the like, as well as non-transitory signal-bearing media as described below. For example, memory 705 may include an SSD, which is coupled to I/O interface 702, such as through an NVMe-PCIe bus, SATA bus or other bus. Moreover, one or more SSDs may be used, such as for NVMe, RAID or other multiple drive storage for example.

I/O interface 702 may include chip set chips, graphics processors, and/or daughter cards, among other known circuits. In this example, I/O interface 702 may be a Platform Controller Hub ("PCH"). I/O interface 702 may be coupled to a conventional keyboard, network, mouse, camera, microphone, display printer, and interface circuitry adapted to receive and transmit data, such as data files and the like.

Programmed computing device 710 may optionally include one or more peripheral cards 709. An example of a daughter or peripheral card may include a network interface card ("NIC"), a display interface card, a modem card, and a Universal Serial Bus ("USB") interface card, among other known circuits. Optionally, one or more of these peripherals may be incorporated into a motherboard hosting CPU 704 and I/O interface 702. Along those lines, IPU 707 may be incorporated into CPU 704 and/or may be of a separate peripheral card.

Programmed computing device 710 may be coupled to a number of client computers, server computers, or any combination thereof via a conventional network infrastructure, such as a company's Intranet and/or the Internet, for example, allowing distributed use. Moreover, a storage device, such as an SSD for example, may be directly coupled to such a network as a network drive, without having to be directly internally or externally coupled to programmed computing device 710. However, for purposes of clarity and not limitation, it shall be assumed that an SSD is housed in programmed computing device 710.

Memory 705 may store all or portions of one or more programs or data, including variables or intermediate information during execution of instructions by CPU 704, to implement processes in accordance with one or more examples hereof to provide program product 720. Program product 720 may be for implementing portions of process flows, as described herein. Additionally, those skilled in the art will appreciate that one or more examples hereof may be implemented in hardware, software, or a combination of hardware and software. Such implementations may include a number of processors or processor cores independently executing various programs, dedicated hardware and/or programmable hardware.

Along those lines, implementations related to use of computing device 710 for implementing techniques described herein may be performed by computing device 710 in response to CPU 704 executing one or more sequences of one or more instructions contained in main memory of memory 705. Such instructions may be read into such main memory from another machine-readable medium, such as a storage device of memory 705. Execution of the sequences of instructions contained in main memory may cause CPU 704 to perform one or more process steps described herein. In alternative implementations, hardwired circuitry may be used in place of or in combination with software instructions for such implementations. Thus, the example implementations described herein should not be considered limited to any specific combination of hardware circuitry and software, unless expressly stated herein otherwise.

One or more program(s) of program product 720, as well as documents thereof, may define functions of examples hereof and can be contained on a variety of non-transitory tangible signal-bearing media, such as computer- or machine-readable media having code, which include, but are not limited to: (i) information permanently stored on non-writable storage media (e.g., read-only memory devices within a computer such as CD-ROM or DVD-ROM disks readable by a CD-ROM drive or a DVD drive); or (ii) alterable information stored on writable storage media (e.g., floppy disks within a diskette drive or flash drive or hard-disk drive or read/writable CD or read/writable DVD).

Computer readable storage media encoded with program code may be packaged with a compatible device or provided separately from other devices. In addition, program code may be encoded and transmitted via wired optical, and/or wireless networks conforming to a variety of protocols, including the Internet, thereby allowing distribution, e.g., via Internet download. In implementations, information downloaded from the Internet and other networks may be used to provide program product 720. Such transitory tangible signal-bearing media, when carrying computer-readable instructions that direct functions hereof, represent implementations hereof.

Along those lines the term "tangible machine-readable medium" or "tangible computer-readable storage" or the like refers to any tangible medium that participates in providing data that causes a machine to operate in a specific manner. In an example implemented using computer system 700, tangible machine-readable media are involved, for example, in providing instructions to CPU 704 for execution as part of programmed product 720. Thus, a programmed computing device 710 may include programmed product 720 embodied in a tangible machine-readable medium. Such a medium may take many forms, including those describe above.

The term "transmission media", which includes coaxial cables, conductive wire and fiber optics, including traces or wires of a bus, may be used in communication of signals, including a carrier wave or any other transmission medium from which a computer can read. Transmission media can also take the form of acoustic or light waves, such as those generated during radio-wave and infra-red data communications.

Various forms of tangible signal-bearing machine-readable media may be involved in carrying one or more sequences of one or more instructions to CPU 704 for execution. For example, instructions may initially be carried on a magnetic disk or other storage media of a remote computer. The remote computer can load the instructions into its dynamic memory and send such instructions over a transmission media using a modem. A modem local to computer system 700 can receive such instructions on such transmission media and use an infra-red transmitter to convert such instructions to an infra-red signal. An infra-red detector can receive such instructions carried in such infra-red signal and appropriate circuitry can place such instructions on a bus of computing device 710 for writing into main memory, from which CPU 704 can retrieve and execute such instructions. Instructions received by main memory may optionally be stored on a storage device either before or after execution by CPU 704.

Computer system 700 may include a communication interface as part of I/O interface 702 coupled to a bus of computing device 710. Such a communication interface may provide a two-way data communication coupling to a network link connected to a local network 722. For example, such a communication interface may be a local area network ("LAN") card to provide a data communication connection to a compatible LAN. Wireless links may also be implemented. In any such implementation, a communication interface sends and receives electrical, electromagnetic or optical signals that carry digital and/or analog data and instructions in streams representing various types of information.

A network link to local network 722 may provide data communication through one or more networks to other data devices. For example, a network link may provide a connection through local network 722 to a host computer 724 or to data equipment operated by an Internet Service Provider ("ISP") 726 or another Internet service provider. ISP 726 may in turn provide data communication services through a world-wide packet data communication network, the "Internet" 728. Local network 722 and the Internet 728 may both use electrical, electromagnetic or optical signals that carry analog and/or digital data streams. Data carrying signals through various networks, which carry data to and from computer system 700, are exemplary forms of carrier waves for transporting information.

Wireless circuitry of I/O interface 702 may be used to send and receive information over a wireless link or network to one or more other devices' conventional circuitry such as an antenna system, an RF transceiver, one or more amplifiers, a tuner, one or more oscillators, a digital signal processor, a CODEC chipset, memory, and the like. In some implementations, wireless circuitry may be capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, WIFI (such as IEEE 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol. A computing device can include wireless circuitry that can communicate over several different types of wireless networks depending on the range required for the communication. For example, a short-range wireless transceiver (e.g., Bluetooth), a medium-range wireless transceiver (e.g., WIFI), and/or a long range wireless transceiver (e.g., GSM/GPRS, UMTS, CDMA2000, EV-DO, and LTE/LTE-Advanced) can be used depending on the type of communication or the range of the communication.

Computer system 700 can send messages and receive data, including program code, through network(s) via a network link and communication interface of I/O interface 702. In the Internet example, a server 730 might transmit a requested code for an application program through Internet 728, ISP 726, local network 722 and I/O interface 702. A server/Cloud-based system 730 may include a backend application for providing one or more applications or services as described herein. Received code may be executed by processor 704 as it is received, and/or stored in a storage device, or other non-volatile storage, of memory 705 for later execution. In this manner, computer system 700 may obtain application code in the form of a carrier wave.

While the foregoing describes exemplary apparatus(es) and/or method(s), other and further examples in accordance with the one or more aspects described herein may be devised without departing from the scope hereof, which is determined by the claims that follow and equivalents thereof. Claims listing steps do not imply any order of the steps. Trademarks are the property of their respective owners.

What is claimed is:

1. A method for attendee authentication, comprising:
    having a robot gatekeeper with a multi-function printer with a memory to store program code including for character recognition and handwriting analysis; and
    executing the program code by a processor coupled to the memory to initiate operations for:
        instructing, by the robot gatekeeper, for placement of a hand for a palm vein scanner and placement of a badge for a badge reader;
        reading a badge with the badge reader to obtain first identification information;
        reading a palm of the hand with the palm vein scanner to obtain first biometric data;
        accessing a database to obtain second identification information responsive to the first identification information;
        comparing the first biometric data and second biometric data obtained from the second identification information;
        responsive to at least a threshold confidence level between the first biometric data and the second biometric data, printing an anti-tampering feature on a card;
        scanning a hand written sample on the card; and
        analyzing the hand written sample scanned with respect to at least one handwriting exemplar in or associated with the second identification information.

2. The method according to claim 1, wherein the badge reader is a Radio Frequency Identification reader.

3. The method according to claim 1, wherein the analyzing is performed with unsupervised machine learning.

4. The method according to claim 1, wherein the analyzing is performed with supervised machine learning.

5. The method according to claim 1, wherein the printing includes printing a challenge question from the second identification information on the card with the anti-tampering feature.

6. The method according to claim 5, wherein the challenge question is tied to a challenge response stored in a secure format with the second identification information.

7. The method according to claim 6, wherein the secure format includes encrypting the challenge response.

8. The method according to claim 7, further comprising, responsive to the challenge response being correct, issuing a code for at least one of a safe and a secure meeting room.

9. The method according to claim 1, further comprising skeletal tracking to ensure the placement of the hand does not move outside a bounded region.

10. The method according to claim 1, further comprising skeletal tracking to ensure the hand written sample on the card is an original from a prospective attendee.

11. An information processing system for attendee authentication, comprising:
    a robot gatekeeper having a multi-function printer with a memory to store program code including for character recognition and handwriting analysis; and
    a processor coupled to the memory and configured to execute the program code to initiate operations for:
        instructing, by the robot gatekeeper, for placement of a hand for a palm vein scanner and placement of a badge for a badge reader;
        reading a badge with the badge reader to obtain first identification information;
        reading a palm of the hand with the palm vein scanner to obtain first biometric data;
        accessing a database to obtain second identification information responsive to the first identification information;
        comparing the first biometric data and second biometric data obtained from the second identification information;
        responsive to at least a threshold confidence level between the first biometric data and the second biometric data, printing an anti-tampering feature on a card;
        scanning a hand written sample on the card; and
        analyzing the hand written sample scanned with respect to at least one handwriting exemplar in or associated with the second identification information.

12. The information processing system according to claim 11, wherein the badge reader is a Radio Frequency Identification reader.

13. The information processing system according to claim 11, wherein the analyzing is performed with unsupervised machine learning.

14. The information processing system according to claim 11, wherein the analyzing is performed with supervised machine learning.

15. The information processing system according to claim 11, wherein the printing includes printing a challenge question from the second identification information on the card with the anti-tampering feature.

16. The information processing system according to claim 15, wherein the challenge question is tied to a challenge response stored in a secure format with the second identification information.

17. The information processing system according to claim 16, wherein the secure format includes an encryption of the challenge response.

18. The information processing system according to claim 16, further comprising, responsive to the challenge response being correct, issuing a code for at least one of a safe and a secure meeting room.

19. The information processing system according to claim 16, further comprising skeletal tracking to ensure the placement of the hand does not move outside a bounded region.

20. The information processing system according to claim 16, further comprising skeletal tracking to ensure the hand written sample on the card is an original from a prospective attendee.

* * * * *